(12) United States Patent
Kim

(10) Patent No.: US 11,279,329 B2
(45) Date of Patent: Mar. 22, 2022

(54) EMERGENCY BRAKING SYSTEM AND METHOD OF CONTROLLING THE SAME

(71) Applicant: Mando Corporation, Pyeongtaek-si (KR)

(72) Inventor: NAC Dong Kim, Uiwang-si (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 178 days.

(21) Appl. No.: 16/737,301

(22) Filed: Jan. 8, 2020

(65) Prior Publication Data

US 2020/0247370 A1 Aug. 6, 2020

(30) Foreign Application Priority Data

Feb. 1, 2019 (KR) .......................... 10-2019-0013664

(51) Int. Cl.
  *B60T 7/22* (2006.01)
  *B60T 8/171* (2006.01)
(52) U.S. Cl.
  CPC ................ *B60T 7/22* (2013.01); *B60T 8/171* (2013.01); *B60T 2201/022* (2013.01); *B60T 2270/89* (2013.01)
(58) Field of Classification Search
  CPC ...... B60T 7/22; B60T 8/171; B60T 2201/022; B60T 2270/89; B60T 2260/04; B60T 2230/08
  See application file for complete search history.

(56) References Cited

U.S. PATENT DOCUMENTS

| | | | |
|---|---|---|---|
| 6,604,592 B2* | 8/2003 | Pietsch | B60K 31/0008 180/168 |
| 2006/0091728 A1* | 5/2006 | Fulks | B60T 7/22 303/193 |
| 2012/0322617 A1* | 12/2012 | Takahashi | F16H 59/44 477/96 |
| 2015/0187217 A1* | 7/2015 | Yao | G08G 1/166 701/301 |
| 2015/0203081 A1* | 7/2015 | Paulson | B60T 8/58 701/70 |
| 2018/0059236 A1* | 3/2018 | Wodrich | G01S 13/867 |
| 2019/0061717 A1* | 2/2019 | Takemura | B60T 13/686 |
| 2020/0189336 A1* | 6/2020 | Sharma | B60D 1/36 |

FOREIGN PATENT DOCUMENTS

KR 10-2016-0123110 A 10/2016

* cited by examiner

*Primary Examiner* — Thomas Ingram
(74) *Attorney, Agent, or Firm* — Morgan, Lewis & Bockius LLP

(57) ABSTRACT

An emergency braking system according to an embodiment of the present invention, which performs emergency braking and brake release according to a position of an object detected while a vehicle moves backward, comprises a processor deriving a position of the object by processing data detected by a sensor, and a controller controlling emergency braking and brake release using the derived position of the object, wherein the controller releases a brake through different operation according to an area in which the position of the object is included after emergency braking of a plurality of areas into which a detecting area of the sensor is divided.

18 Claims, 5 Drawing Sheets

EMERGENCY BRAKING SYSTEM AND METHOD OF CONTROLLING THE SAME

This application claims the benefit of Korean Patent Application No. 10-2019-0013664, filed on Feb. 1, 2019, in the Korean Intellectual Property Office, the disclosure of which is incorporated herein by reference in its entirety.

BACKGROUND

1. Field of the Invention

The present invention relates to an emergency braking system and a method of controlling the same, and more particularly, to an emergency braking system which minimizes faulty brake release when a brake is released after emergency braking and releases the brake according to driver's intention, and a method of controlling the same.

2. Discussion of Related Art

Since a rear area of a vehicle moving backward for parking has many blind spots, there is a high risk for collision. Recently, to prepare for the risk of collision, a system for detecting collision risk using various sensors and performing emergency braking when the collision risk is detected has been developed and applied to a vehicle. The emergency braking system is disclosed in Korean Laid-open Patent Application No. 10-2016-0123110 as a representative.

However, a conventional emergency braking system is focused on control technology for detecting collision risk and braking by the detection. That is, technology for controlling brake release after emergency braking is insufficient in the conventional emergency braking system. For example, the conventional emergency braking system uses a simple method of releasing a brake according to driving operation of a driver performed after emergency braking. Therefore, due to operational errors of a driver caused by inexperienced driving or discomposure after the emergency braking, collision between a vehicle and an object by faulty brake release may occur.

(Patent Document 1) KR 10-2016-0123110 A

SUMMARY OF THE INVENTION

The present invention is directed to providing an emergency braking system which minimizes faulty brake release when a brake is released after emergency braking and releases the brake according to driver's intention, and a method of controlling the same.

However, objects of the present invention are not limited to the above-mentioned objects, and other objects that are not mentioned may be obviously understood by those skilled in the art to which the present invention pertains from the following description.

According to an aspect of the present invention, there is provided an emergency braking system which performs emergency braking and brake release according to a position of an object detected while a vehicle moves backward, the emergency braking system comprising (1) a processor configured to derive position of the object by processing data detected by a sensor, and (2) a controller configured to control emergency braking and brake release using the derived position of object.

The controller may release the brake through different operation according to an area in which the position of the object is included after emergency braking of a plurality of areas into which a detecting area of a sensor is divided.

The plurality of areas may be divided by a distance from the object to the vehicle after emergency braking.

The controller may maintain a braking state when the object is positioned in a first detecting area after emergency braking, and may release the brake according to selection of a user when the object is positioned in a second detecting area farther than the first detecting area after emergency braking.

When the object is positioned in the second detecting area after emergency braking, the controller may release the brake according to a selected command input according to a relevant option when an option of selecting whether the brake is released is displayed on a display in the vehicle.

The sensor may include an ultrasonic sensor and a camera sensor.

The first detecting area may be an area detected by the ultrasonic sensor and the camera sensor.

The second detecting area may include an area detected by the ultrasonic sensor and the camera sensor and an area detected only by the camera sensor.

The controller may release the brake when a gear is shifted to a forward gear while the object is positioned in the first detecting area after emergency braking and a braking state is maintained.

The controller may release the brake when a gear is shifted to a forward gear while a user selects non-release of the brake according to a position of object in the second detecting area after emergency braking and a braking state is maintained.

The controller may release the brake when specific driving operation of a driver is detected in a third case in which the object is positioned in a third detecting area farther than the second detecting area after emergency braking.

The specific driving operation may be at least one operation of applying a brake pedal pressure less than or equal to a reference, applying an accelerator pedal pressure greater than or equal to a reference, or shifting a gear.

The third detecting area may be an area detected only by the camera sensor.

A brake release time may vary according to an area in which a position of object is included after emergency braking.

According to another aspect of the present invention, there is provided a control method, which allows an emergency barking system to perform emergency braking and brake release according to a position of an object detected while a vehicle moves backward, the control method comprising (1) a position deriving operation of deriving a position of the object by processing data detected by a sensor, and (2) a control operation of controlling emergency braking and brake release using the derived position of the object.

The control operation may include an operation of releasing brake through different operation according to an area in which the position of the object is included after emergency braking of a plurality of areas into which a detecting area of the sensor is divided.

The control operation may include an operation of maintaining a braking state when the object is positioned in a first detecting area after emergency braking and releasing the brake according to selection of a user when the object is positioned in a second detecting area farther than the first detecting area after emergency braking.

The control operation may include an operation of releasing the brake according to a selected command input according to a relevant option by displaying an option of selecting whether the brake is released on a display in the vehicle when the object is positioned in the second detecting area after emergency braking.

The control operation may an operation of releasing the brake when a gear is shifted to a forward gear while the object is positioned in the first detecting area after emergency braking and a braking state is maintained.

The control operation may include an operation of releasing the brake when a gear is shifted to a forward gear while a user selects non-release of the brake according to a position of the object in the second detecting area after emergency braking and a braking state is maintained.

The control operation may include an operation of releasing the brake when specific driving operation of a driver is detected in a third case in which the object is positioned in a third detecting area farther than the second detecting area after emergency braking.

The control operation may include an operation of differently applying a brake release time according to an area in which a position of the object is included after emergency braking.

According to another aspect of the present invention, A non-transitory computer readable medium which allows an emergency barking system to perform emergency braking and brake release according to a position of the object detected while a vehicle moves backward, storing computer executable instructions when executed by a processor, the computer readable medium comprising (1) position deriving program instructions that derive a position of the object by processing data detected by a sensor and (2) control program instructions that control emergency braking and brake release using the derived position of the object.

The control program instructions may release a brake through different operation according to an area in which a position of the object is included after emergency braking of a plurality of areas into which a detecting area of the sensor is divided.

The control program instructions may maintain a braking state when the object is positioned in a first detecting area after emergency braking and releasing the brake according to selection of a user when the object is positioned in a second detecting area farther than the first detecting area after emergency braking.

The control program instructions may include release the brake according to a selected command input according to a relevant option by displaying an option of selecting whether the brake is released on a display in the vehicle when the object is positioned in the second detecting area after emergency braking.

The control operation may an operation of releasing the brake when a gear is shifted to a forward gear while the object is positioned in the first detecting area after emergency braking and a braking state is maintained.

The control program instructions may release the brake when a gear is shifted to a forward gear while a user selects non-release of the brake according to a position of the object in the second detecting area after emergency braking and a braking state is maintained.

The control program instructions may release the brake when specific driving operation of a driver is detected in a third case in which the object is positioned in a third detecting area farther than the second detecting area after emergency braking.

The control program instructions may differently apply a brake release time according to an area in which a position of the object is included after emergency braking.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
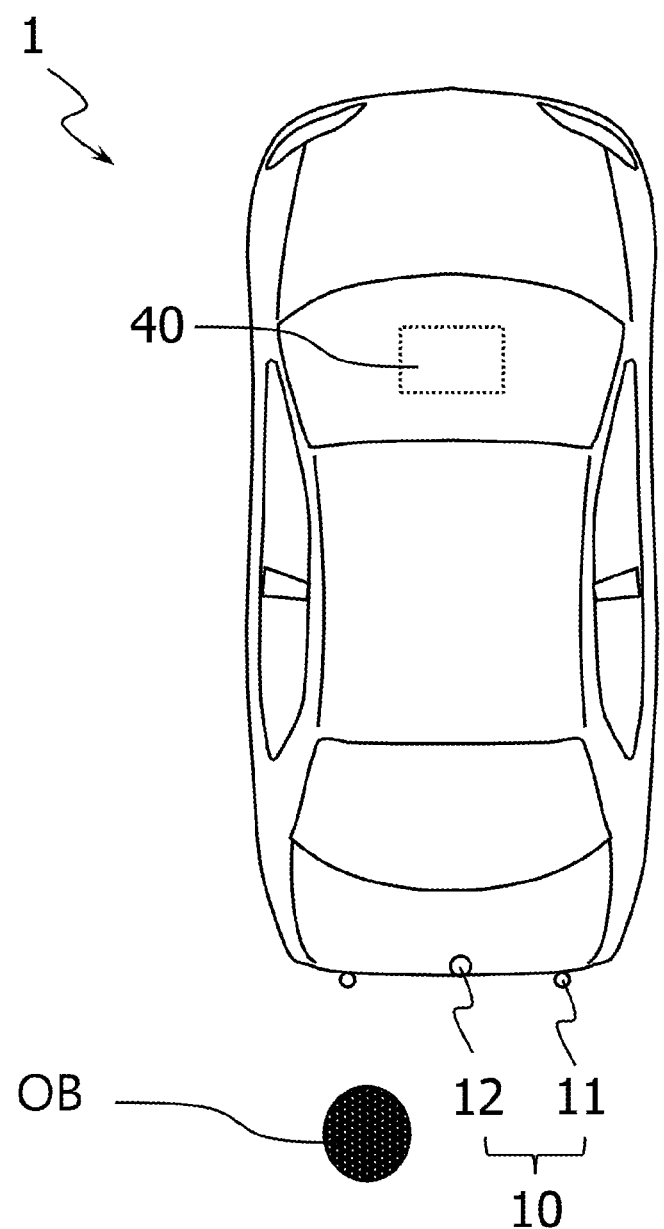
FIG. 1 is a conceptual view of an emergency braking system according to one embodiment of the present invention.

The objects and units of the present invention and advantages according thereto will be more obvious from the following detail descriptions with reference to the accompanying drawings, and accordingly, a technical sprit of the present invention may be easily practiced by those skilled in the art to which the present invention pertains. In descriptions of the present invention, when detailed descriptions of related well-known functions related to the present invention unnecessarily obscure the gist of the present invention, the detailed descriptions may be omitted.

Terms used in the present invention are only used to describe exemplary embodiments and do not limit the present invention. In the specification, singular forms are intended to include plural forms unless specifically mentioned in a sentence. The terms "comprise," "provide," "include," or "have" used in this specification do not preclude the presence or addition of one or more other elements other than the mentioned elements.

In the specification, terms, such as "or," "at least one," and the like, may represent one of listed words or may represent combination of two or more combinations thereof. For example, "A or B," and "at least one of A or B" may include one of A or B and may include both A and B.

Descriptions that follow "for example" and the like may not exactly correspond to the presented information such as cited features, variations, or values, and particular forms according to various embodiments of the present invention should not be limited by effects such as deformation including allowable error, measured errors, limitation in measurement precision, and typically known other factors.

It will be understood that when an element is referred to as being "connected," or "coupled" to another element, it can be directly connected or coupled to the other element or intervening elements may be present. In contrast, when an element is referred to as being "directly connected," or "directly coupled" to another element, intervening elements may not be present.

When it is mentioned that an element is referred to as being "on" or "in contact with" another element, the element may be in direct contact with or connected to the other element but may be understood that there is an intervening element between the two elements. In contrast, when it is mentioned that an element is "directly on," or "in direct contact with" another element, it may be understood that there is no intervening element between the two elements. Other expressions describing a relationship between elements, for example, "between," "directly between," and the like, should be similarly interpreted.

In this specification, although the terms first, second, and the like are used to describe various elements, the elements are not limited by the terms. Further, the terms may be interpreted to limit in the order of elements and may be used to distinguish one element from another. For example, when a "first element" may be referred to as a "second element," a "second element" may also be similarly referred to as a "first element."

Unless otherwise defined, all terms used in the specification have the same meaning as commonly understood by those skilled in the art to which the present invention belongs. In addition, terms defined in generally used dictionaries are not interpreted ideally or excessively unless they have been clearly and specially defined.

Hereinafter, exemplary embodiments according to the present invention will be described in detail with reference to the accompanying drawings.

Figure 2:
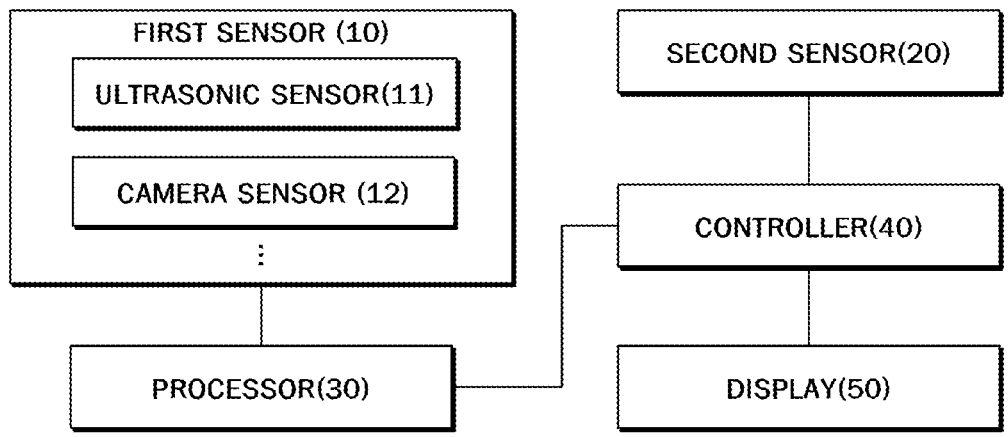
FIG. 2 is a block configuration diagram of the emergency braking system according to one embodiment of the present invention.

FIG. 1 is a conceptual view of an emergency braking system according to one embodiment of the present invention, and FIG. 2 is a block configuration diagram of the emergency braking system according to one embodiment of the present invention.

An emergency braking system according to the embodiment of the present invention, which performs emergency braking and brake release according to a position of object OB detected while a vehicle 1 moves backward, as shown in FIGS. 1 and 2, includes a first sensor 10, a second sensor 20, a processor 30, and a controller 40.

The emergency braking system according to the embodiment of the present invention may be a driver assistance system (DAS) or an advanced driver assistance system (ADAS) or may be a configuration included in the systems, but the present invention is not limited thereto.

The first sensor 10, which is a sensor detecting an external surrounding state of the vehicle 1, may be referred to as an external sensor. Particularly, the first sensor 10 generates first data for the object OB detected in a rear area of the vehicle 1 moving backward and may transfer the first data to the processor 30 and the controller 40. The plurality of first sensors 10 may be installed at a rear portion or a rear side portion of the vehicle 1.

Figure 3:
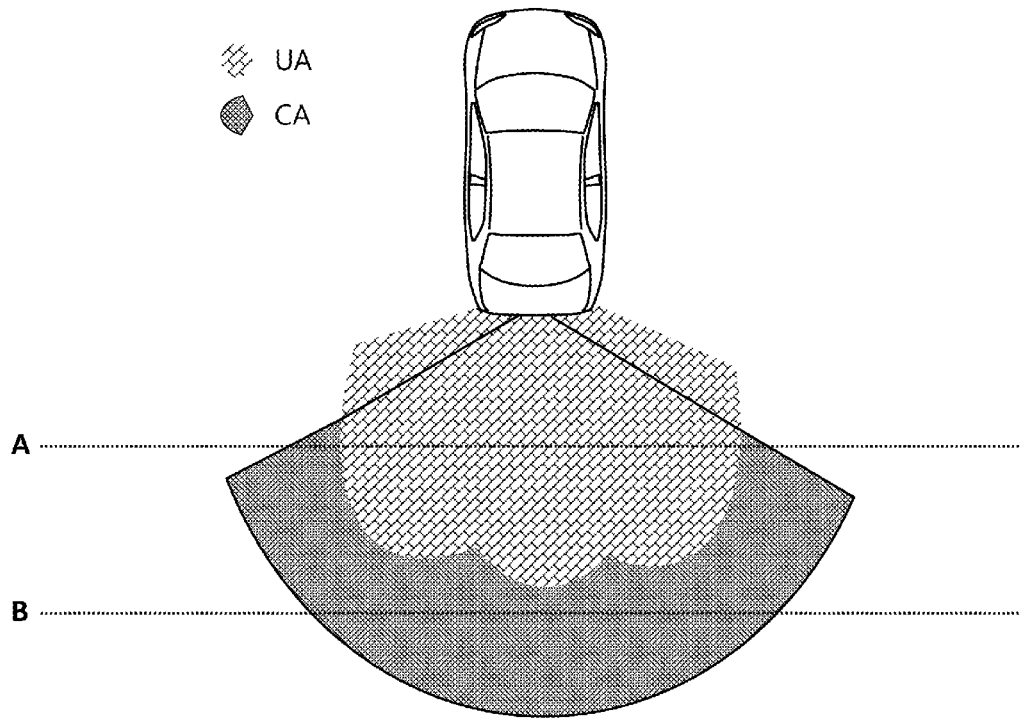
FIG. 3 is a view of an example illustrating a detecting area (UA) of an ultrasonic sensor (11) and a detecting area (CA) of a camera sensor (12)

FIG. 3 is a view of an example illustrating a detecting area UA of an ultrasonic sensor 11 and a detecting area CA of a camera sensor 12.

The first sensor 10 may be at least one of the ultrasonic sensor 11, the camera sensor 12, or a radio detection and ranging (RADAR) sensor (not shown). In this case, the ultrasonic sensor 11 may detect the object OB using a reflected wave of ultrasonic waves. The camera sensor 12 may detect an image for the object OB using a wide-angle lens of a camera. Referring to FIG. 3, the ultrasonic sensor 11 may have a short-distance detecting area UA in which a width is relatively narrow. On the contrary, the camera sensor 12 has a detecting area CA in which a width is relatively wide and may detect a long-distance image unless an obstacle or terrain interferes. Meanwhile, the RADAR sensor may detect the object OB using a principle of RADAR.

However, hereinafter, to control brake release after emergency braking, an example in which the ultrasonic sensor 11 or the camera sensor 12 is used as the first sensor 10 is described, but the preset invention is not limited thereto. That is, use of the RADAR sensor is not excluded.

The second sensor 20, which is a sensor detecting driving operation for the vehicle of a driver, may be referred to as an internal sensor. In this case, the driving operation, which is an operation operated by a user with reference to movement of the vehicle 1, may be at least one operation of applying a brake pedal pressure less than or equal to a reference, applying an accelerator pedal pressure greater than or equal to a reference, or shifting gear. That is, the second sensor 20 generates second data for the brake pedal pressure, the accelerator pedal pressure, and gear shifting and may transfer the second data to the controller 40.

The processor 30 may derive a position of object OB by processing the first data detected by the first sensor 10. In this case, the processor 30 may apply various position extracting algorisms for processing the first data varying according to a type of the first sensor 10.

Particularly, the processor 30 may divide the detecting area of the first sensor 10 into a plurality of areas. In this case, the plurality of areas may be divided according to a distance from the object OB to the vehicle. For example, the processor 30, as shown in FIG. 3, may divide the detecting area of the first sensor 10 into a first detecting area to a third detecting area, but the present invention is not limited thereto.

The first detecting area, which is a detecting area in a short distance from the vehicle 1, may be a detecting area between the vehicle 1 and a dotted line A. The third detecting area, which is a detecting area in the longest distance from the vehicle 1, may be a detecting area behind a dotted line B. A second detecting area, which is a detecting area between the first detecting area and the third detecting area, may be a detecting area between the dotted line A and the dotted line B. Although the dotted line A and the dotted line B are shown as a straight line in FIG. 3, the present invention is not limited thereto. That is, the dotted line A and the dotted line B may be a curved line.

Particularly, referring to FIG. 3, the first detecting area may be an area detectable by the ultrasonic sensor 11 and the camera sensor 12. The second detecting area may be an area including an area detectable by the ultrasonic sensor 11 and the camera sensor 12 and an area detectable only by the camera sensor 12. The third detecting area may be an area detectable only by the camera sensor 12.

Thereafter, the processor 30 may transfer information on derived position of object OB to the controller 40. In this case, the information on position of object OB transferred to the controller 40 includes information on an area in which the object OB is included of the plurality of areas into which the detecting area of the first sensor 10 is divided, as well as information on direction of and distance to the object OB.

The controller 40 controls emergency braking and brake release. That is, the controller 40 controls emergency braking and brake release of the vehicle 1 by controlling operation of the brake of the vehicle 1 using information on position of object OB transferred from the processor 30. Particularly, the controller 40 may release the brake through a different operation according to an area in which the position of the object is included after emergency braking of the plurality of areas into which the detecting area of the first sensor 10 is divided. However, a specific process for emergency braking and brake release after the emergency braking will be described below.

The display 50, which is included in the vehicle, may display a variety of information required for driving of the vehicle 1. Further, the display 50 includes a touch screen and may receive various commands from a driver. Further, the display 50 may display an option of selecting whether the brake is released after emergency braking and may transfer a selected command of a user to be input according to a relevant option to the controller 40. The controller 40 may release the brake after the emergency braking according to the selected command of the user.

Hereinafter, processes of emergency braking and brake release after the emergency braking performed by the emergency braking system according to a position of object detected while the vehicle moves backward will be described in more detail below.

Figure 4:
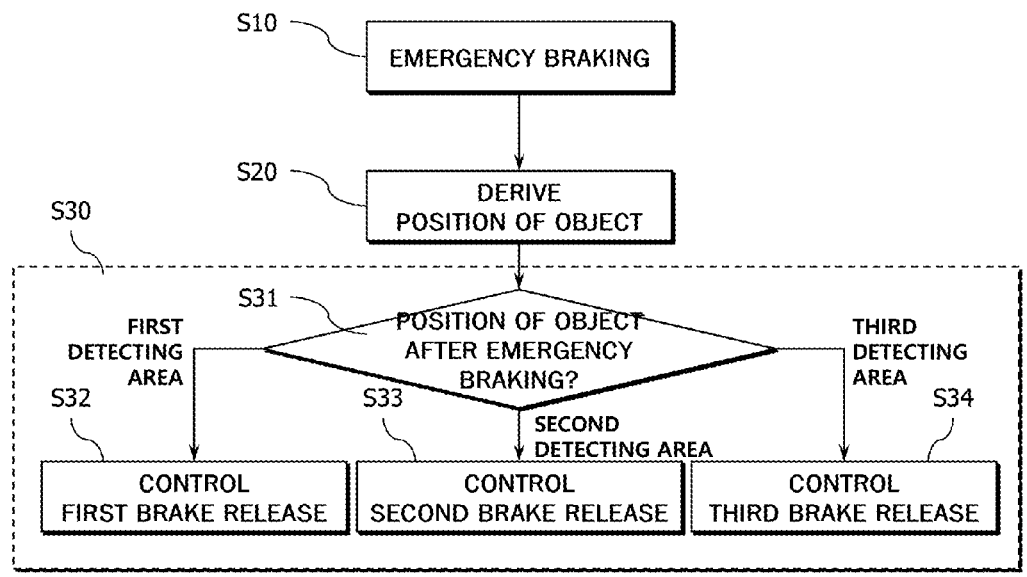
FIG. 4 is a flow chart illustrating control for emergency braking and brake release after emergency braking.
Figure 5A:
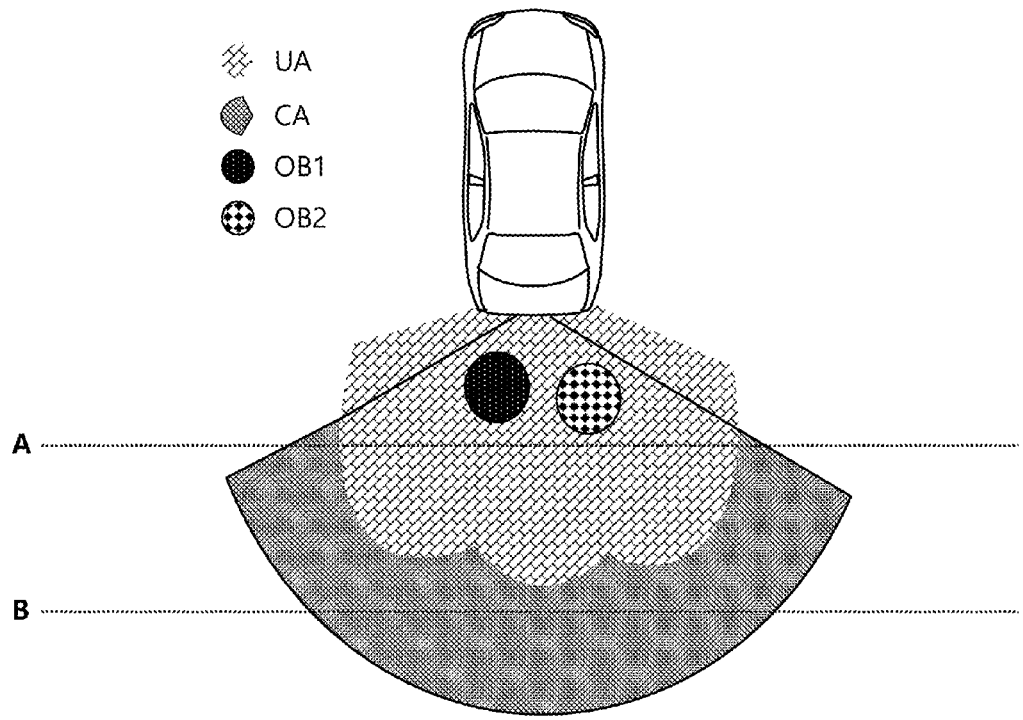
FIGS. 5A, 5B and 5C are views of examples for positions of object (OB) before and after emergency braking.
Figure 5B:
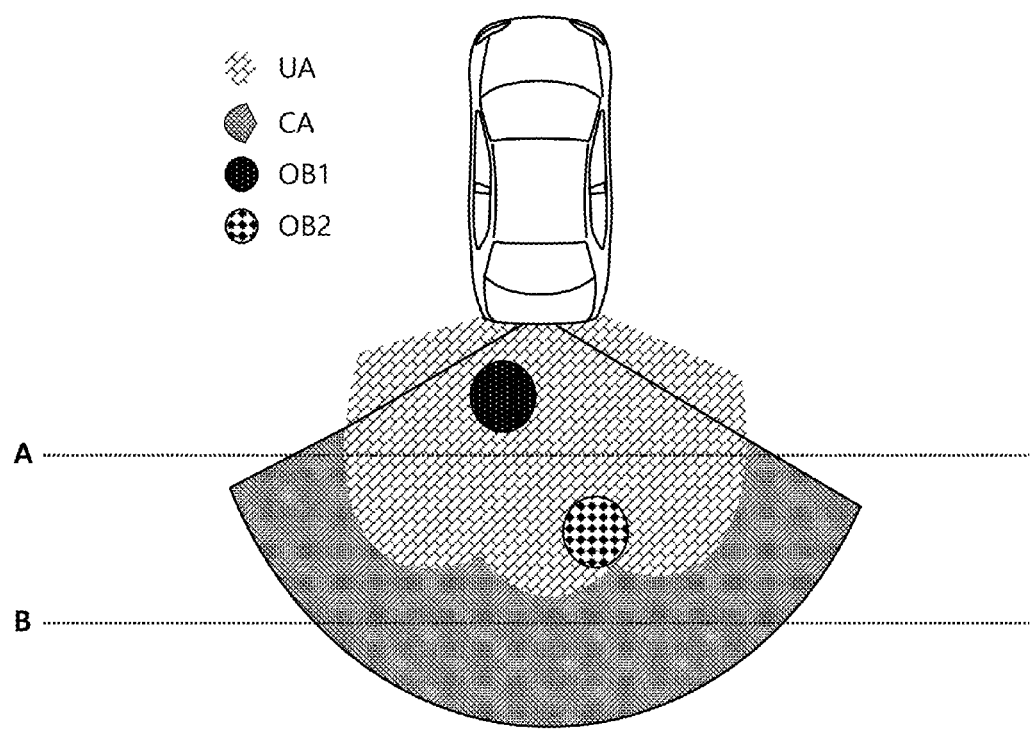
Figure 5C:
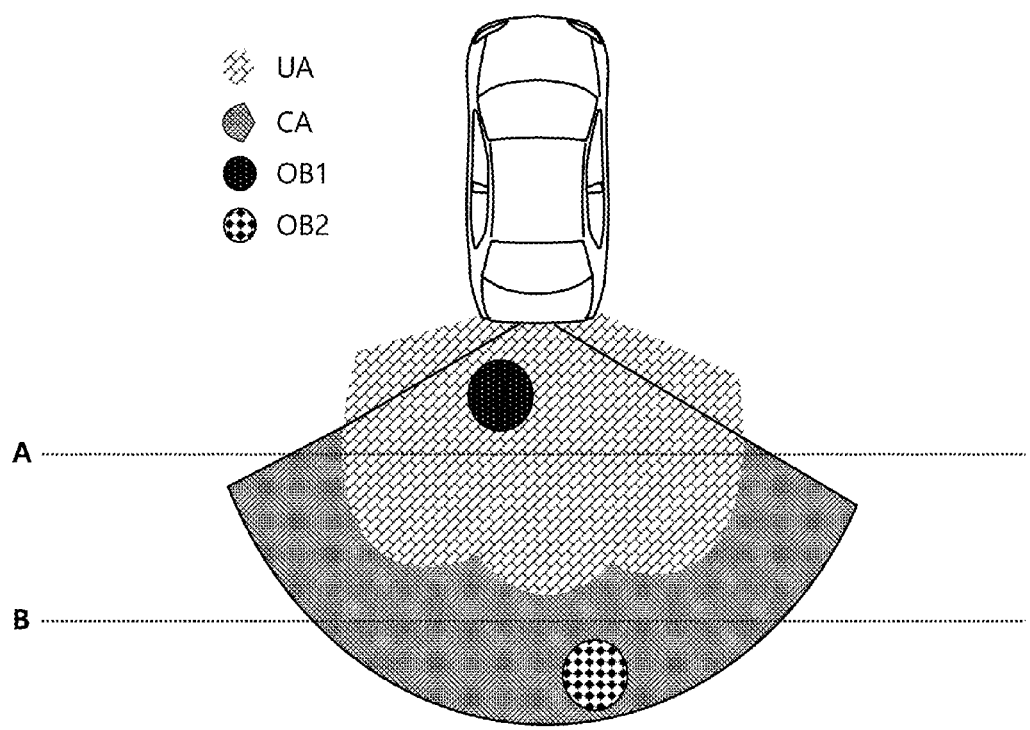

FIG. 4 is a flow chart illustrating control for emergency braking and brake release after emergency braking, and FIGS. 5A, 5B and 5C are views of examples for positions of object OB before and after emergency braking. However, in FIG. 5, the object before emergency braking is represented by 'OB1', and the object after an emergency brake is presented by 'OB2'. In this case, FIG. 5A shows the object OB2 in the first detecting area after emergency braking, FIG. 5B shows the object OB2 in the second detecting area after emergency braking, and FIG. 5C shows the object OB2 in the third detecting area after emergency braking.

First, when collision risk occurs due to the object OB1 detected while the vehicle 1 moves backward, the controller 40 may perform emergency braking (S10). That is, when the collision risk occurs, the controller 40 may stop the vehicle 1 moving backward by controlling a brake to be urgently operated regardless of current driving operation of a user. In this case, the collision risk of the object OB1 may be determined by the processor 30, the controller 40, or other devices.

For example, a case in which a distance between the object OB1 and the vehicle 1 derived from the first data of the first sensor 10 becomes within a predetermined distance may be determined as collision risk. Further, as shown in FIG. 5, a case in which the information on position of object OB1 derived from the first data of the first sensor 10 shows that the object OB1 approaches the first detecting area may be determined as collision risk. However, the present invention is not limited by the above-described method of determining collision risk.

The processor 30 may derive information on position of object OB2 using the first data received from the first sensor 10 (S20). That is, after the emergency braking, the processor 30 may derive information on an area in which the object OB2 is included of the plurality of areas into which the detecting area of the first sensor 10 is divided other than information on distance to the object OB2 and a direction of the object OB2. In this case, the plurality of areas may be divided according to a distance from the vehicle to the object OB2 after the emergency braking.

The controller 40 controls brake release using information on position of object OB2 received from the processor 30 (S30). In this case, the controller 40 may perform brake release (S32 to S34) through different operation according to an area in which a position of the object OB2 is included of the plurality of areas into which the detecting area of the first sensor 10 is divided (S31). That is, according to a position of the object OB2 positioned in the first detecting area to the third detecting area, the controller 40 performs the first brake release control (S32) to the third brake release control (S34).

As shown in FIG. 5A, the object OB2 is positioned in the first detecting area, the controller 40 may continuously maintain a braking state (S32). That is, S32 is control operation for preventing collision risk caused when the object OB2 is still too close to the vehicle 1 even after the emergency braking. In this case, S32 may be performed when the object OB2 is a fixed object or an object moving close to a rear side of the vehicle 1. However, in S32, when a gear of the vehicle 1 is shifted to a forward gear while a braking state is maintained, the controller 40 may release the brake. Since the object OB2 is positioned behind the vehicle 1, the collision risk decreases when the vehicle 1 moves forward. In this case, shifting of a gear may be determined by second data transferred from the second sensor 20.

As shown in FIG. 5B, the object OB2 is positioned in the second detecting area, the controller 40 may perform brake release according to selection of a user (S33). In this case, a case in which the object OB2 is positioned in the second detecting area means that the object OB2 moves to an area in which collision risk is relatively low after emergency braking. Therefore, in S33, the brake may be released according to control intention of a driver.

Specifically, in S33, the controller 40 may display an option of selecting whether the brake is released (that is, a braking state is maintained or the brake is released) on the display 50 in the vehicle 1. For example, the option may be displayed on the display 50 in a pop-up form or may include a guide message "Do you want to release the brake?" and a selection part to which "yes" or "no" for the relevant guide message is selectively input, but the present invention is not limited thereto.

The controller 40 may release the brake according to a selection input of a user for the option displayed on the display 50. For example, when the user selects "yes" in the selection part, the controller 40 releases the brake. On the other hand, when the user selects "no" in the selection part, the controller 40 may continuously maintain a braking state. However, in S33, when a gear of the vehicle 1 is shifted to a forward gear while the user selects non-release of the brake to continuously maintain a brake state, the controller 40 may release the brake. Because the object OB2 is positioned behind the vehicle 1, the collision risk decreases when the vehicle 1 moves forward. In this case, the user may be a driver or a passenger, and shifting of gear may be determined by the second data transferred from the second sensor 20.

As shown in FIG. 5C, when the object OB2 is positioned in the third detecting area, the controller 40 may release the brake when specific driving operation of a user is detected (S34). In this case, a case in which the object OB2 is positioned in the third detecting area means that the object OB2 moves to an area in which collision risk is the lowest after the emergency braking. Therefore, in S34, the brake may be released to move the vehicle 1 according to specific driving operation of the driver. However, the specific driving operation may be determined based on the second data of the second sensor 20. In this case, the specific driving operation may be at least one operation of applying a brake pedal pressure less than or equal to a reference, applying an accelerator pedal pressure greater than or equal to a reference, or shifting of gear. That is, when the driver depresses a brake pedal, presses an accelerator pedal, or shifts a gear, for the driving of the vehicle 1 according to the operations, the controller 40 may release the brake.

Meanwhile, in S32 to S34, the controller 40 may control brake release times to be different when the brake is released according to an area in which a position of object OB2 is included. In this case, a braking pressure is a pressure applied to the brake for stopping of the vehicle 1, and the magnitude of braking pressure gradually decreases when the brake is released. That is, the brake release time refers to time from a starting time of brake release to a time at which the braking pressure completely disappears.

For example, the controller 40 may control the brake release time to decrease in the order of S34, S33, and S32 when the brake is released. The controller 40 may control the brake release time in S32 to be shorter than in S34 and S33 but the brake release times in S34 and S33 are the same when the brake is released. Therefore, the collision risk for the object OB2 due to brake release can be prevented. That is, a case in which operation of S34 or S33 is performed is a case in which the object OB2 is farthest away from the vehicle 1 or is relatively far away from the vehicle 1, and thus collision risk for the object OB2 may be low although the brake is released for the shortest brake release time or a relatively short brake release time. Further, a case in which S32 is performed is a case in which the object OB2 is the closest to the vehicle 1, and thus collision risk for the object OB2 may be low when the brake is released for the longest brake release time.

As described above, an emergency braking system which minimizes faulty brake release when the brake is released after emergency braking and releases the brake according to a driver's intention so as to provide a driver with more precise control of brake release, thereby refining convenience of driving.

Further, the control logic of the present invention may be embodied as non-transitory computer readable media on a computer readable medium containing executable program instructions executed by the processor 30. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The detail description of the present invention has been described regarding a specific embodiment, but may be variously modified by those skilled in the art without departing from the scope of the present invention. Therefore, the scope of the present invention is defined not by the described embodiment but by the appended claims, and encompasses equivalents that fall within the scope of the appended claims.

What is claimed is:

1. An emergency braking system which performs emergency braking and brake release according to a position of an object detected while a vehicle moves backward, the emergency braking system comprising:
a processor configured to derive a position of the object by processing data detected by a sensor; and
a controller configured to control emergency braking and brake release using the derived position of the object,
wherein the controller releases a brake through different operation according to an area in which the position of the object is included after emergency braking of a plurality of areas into which a detecting area of a sensor is divided;
wherein the controller maintains a braking state when the object is positioned in a first detecting area after emergency braking, and releases the brake according to selection of a user when the object is positioned in a second detecting area farther than the first detecting area after emergency braking.

2. The emergency braking system of claim 1, wherein the plurality of areas are divided by a distance from the object to the vehicle after emergency braking.

3. The emergency braking system of claim 1, wherein, when the object is positioned in the second detecting area after emergency braking, the controller releases the brake according to a selected command input according to a relevant option when an option of selecting whether the brake is released is displayed on a display in the vehicle.

4. The emergency braking system of claim 1, wherein the sensor include at least one of an ultrasonic sensor and a camera sensor,
wherein the first detecting area is an area detected by the ultrasonic sensor and the camera sensor, and
the second detecting area includes an area detected by the ultrasonic sensor and the camera sensor and an area detected only by the camera sensor.

5. The emergency braking system of claim 1, wherein the controller releases the brake when a gear is shifted a forward gear while the object is positioned in the first detecting area after emergency braking and a braking state is maintained.

6. The emergency braking system of claim 1, wherein the controller releases the brake when a gear is shifted to a forward gear while a user selects non-release of the brake according to a position of the object in the second detecting area after emergency braking and a braking state is maintained.

7. The emergency braking system of claim 1, wherein the controller releases the brake when specific driving operation of a driver is detected in a third case in which the object is positioned in a third detecting area farther than the second detecting area after emergency braking.

8. The emergency braking system of claim 7, wherein the specific driving operation is at least one operation of applying a brake pedal pressure less than or equal to a reference, applying an accelerator pedal pressure greater than or equal to a reference, or shifting a gear.

9. The emergency braking system of claim 7, wherein:
the sensor includes an ultrasonic sensor and a camera sensor;
the first detecting area is an area detected by an ultrasonic sensor and a camera sensor;
the second detecting area includes an area detected by the ultrasonic sensor and the camera sensor and an area detected only by the camera sensor; and
the third detecting area is an area detected only by the camera sensor.

10. The emergency braking system of claim 1, wherein a brake release time varies when the brake is released according to an area in which a position of the object is included after emergency braking.

11. A control method which allows an emergency barking system to perform emergency braking and brake release according to a position of an object detected while a vehicle moves backward, the control method comprising:
a position deriving operation of deriving a position of the object by processing data detected by a sensor; and
a control operation of controlling emergency braking and brake release using the derived position of the object,
wherein the control operation includes an operation of releasing a brake through different operation according to an area in which the position of the object is included after emergency braking of a plurality of areas into which a detecting area of the sensor is divided;
wherein the control operation includes an operation of maintaining a braking state when the object is positioned in a first detecting area after emergency braking, and releasing the brake according to selection of a user when the object is positioned in a second detecting area farther than the first detecting area after emergency braking.

12. The control method of claim 11, wherein the plurality of areas are divided by a distance from the object to the vehicle after emergency braking.

13. The control method of claim 11, wherein the control operation includes an operation of releasing the brake according to a selected command input according to a relevant option when an option of selecting whether the brake is released is displayed on a display in the vehicle when the object is positioned in the second detecting area after emergency braking.

14. The control method of claim 11, wherein the sensor include at least one of an ultrasonic sensor and a camera sensor,
wherein the first detecting area is an area detected by the ultrasonic sensor and the camera sensor, and
the second detecting area includes an area detected by the ultrasonic sensor and the camera sensor and an area detected only by the camera sensor.

15. The control method of claim 11, wherein the control operation includes an operation of releasing the brake when a gear is shifted a forward gear while the object is positioned in the first detecting area after emergency braking and a braking state is maintained.

16. The control method of claim 11, wherein the control operation includes an operation of releasing the brake when a gear is shifted to a forward gear while a user selects non-release of the brake according to a position of the object in the second detecting area after emergency braking and a braking state is maintained.

17. The control method of claim 11, wherein the control operation includes an operation of releasing the brake when specific driving operation of a driver is detected in a third case in which the object is positioned in a third detecting area farther than the second detecting area after emergency braking.

18. A non-transitory computer readable medium which allows an emergency barking system to perform emergency braking and brake release according to a position of the object detected while a vehicle moves backward, storing computer executable instructions when executed by a processor, the computer readable medium comprising:
position deriving program instructions that derive a position of the object by processing data detected by a sensor; and
control program instructions that control emergency braking and brake release using the derived position of the object,
wherein the control program instructions release a brake through different operation according to an area in which a position of the object is included after emergency braking of a plurality of areas into which a detecting area of the sensor is divided;
wherein the control program instructions maintain a braking state when the object is positioned in a first detecting area after emergency braking, and release the brake according to selection of a user when the object is positioned in a second detecting area farther than the first detecting area after emergency braking.

* * * * *